US009086841B1

(12) United States Patent
Yu et al.

(10) Patent No.: US 9,086,841 B1
(45) Date of Patent: Jul. 21, 2015

(54) CONNECTOR INTEGRATED INTO FRICTION HINGE

(71) Applicant: Google Inc., Mountain View, CA (US)

(72) Inventors: Michelle Yu, Oakland, CA (US); James Tanner, Los Gatos, CA (US); Aaron Leiba, San Francisco, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 13/779,678

(22) Filed: Feb. 27, 2013

Related U.S. Application Data

(60) Provisional application No. 61/700,266, filed on Sep. 12, 2012.

(51) Int. Cl.
| | |
|---|---|
| *H05K 5/00* | (2006.01) |
| *H05K 7/00* | (2006.01) |
| *G06F 1/16* | (2006.01) |
| *H05K 13/00* | (2006.01) |

(52) U.S. Cl.
CPC .......... *G06F 1/1601* (2013.01); *H05K 13/0023* (2013.01)

(58) Field of Classification Search
CPC .......................... G06F 1/1601; H05K 13/0023
USPC ......................................... 361/679.4, 679.28
See application file for complete search history.

(56) References Cited

U.S. PATENT DOCUMENTS

| | | | | |
|---|---|---|---|---|
| 6,078,496 | A * | 6/2000 | Oguchi et al. | 361/679.55 |
| 6,101,088 | A * | 8/2000 | Nakajima et al. | 361/679.55 |
| 6,658,275 | B1 * | 12/2003 | Hantunen et al. | 455/575.3 |
| 7,239,504 | B2 | 7/2007 | Schlesener et al. | |
| 7,255,582 | B1 | 8/2007 | Liao | |
| 7,489,507 | B2 * | 2/2009 | Karashima et al. | 361/679.28 |
| 7,530,823 | B1 | 5/2009 | Thornton et al. | |
| 7,602,606 | B2 | 10/2009 | Schlesener et al. | |
| 7,631,410 | B2 | 12/2009 | Schlesener et al. | |
| 8,081,439 | B2 * | 12/2011 | Karashima et al. | 361/679.27 |
| 2005/0117286 | A1 * | 6/2005 | Karashima et al. | 361/683 |
| 2006/0023408 | A1 | 2/2006 | Schlesener et al. | |
| 2007/0201199 | A1 | 8/2007 | Schlesener et al. | |
| 2007/0201200 | A1 | 8/2007 | Schlesener et al. | |

* cited by examiner

*Primary Examiner* — Anthony Haughton
(74) *Attorney, Agent, or Firm* — McDermott Will & Emery LLP

(57) ABSTRACT

A device having a display and a keyboard is provided. The device includes a hinge disposed intermediate of the display and the keyboard, wherein the hinge includes a housing, a friction band, and a connector. The friction band is in compression and configured to create friction against the housing. The housing is part of the connector.

26 Claims, 5 Drawing Sheets

CONNECTOR INTEGRATED INTO FRICTION HINGE

CROSS-REFERENCE TO RELATED APPLICATIONS

This application claims priority to U.S. Provisional Patent Application Ser. No. 61/700,266, filed Sep. 12, 2012, which is incorporated herein by reference in its entirety.

FIELD

The present invention generally relates to connectors and, in particular, relates to a connector integrated into a friction hinge.

BACKGROUND

A device, such as a portable computer or laptop, may be designed to minimize its total thickness "t". For example, the device may be designed to have a total thickness of about 8 millimeters (mm), with the display portion of the device and the base portion of the device each having a thickness of about 4 mm, and one or more hinges having a diameter of about 8 mm.

SUMMARY

The disclosed subject matter relates to a device having a display and a keyboard. The device comprises a hinge disposed intermediate of the display and the keyboard. The hinge comprises a housing, a friction band, and a connector. The friction band is in compression and configured to create friction against the housing. The housing is part of the connector.

The disclosed subject matter further relates to a process for mounting a connector within a device. The process comprises attaching a display and a keyboard to a hinge, wherein the hinge comprises a housing and a friction band, wherein the friction band is in compression and configured to create friction against the housing. The process further comprises mounting a connector within the hinge, wherein the housing is a part of the connector.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A device, such as a portable computer or laptop, may be designed to minimize its total thickness "t". For example, the device may be designed to have a total thickness of about 8 millimeters (mm), with the display portion of the device and the base portion of the device each having a thickness of about 4 mm, and one or more hinges having a diameter of about 8 mm. In this example, certain connectors, such as an off-the-shelf micro USB connector, display connector, or audio connector, may not physically fit within the thickness of the display portion or the base portion of the device.

In some aspects, the connector may physically fit within a hinge assembly because of its larger diameter in comparison to the thickness of the display portion and the base portion. However, because a conventional hinge assembly may comprise a friction band wound around a solid or hollow shaft, there is typically not sufficient clearance in the hinge assembly to house the connector.

According to various aspects of the subject technology, a hinge assembly with an integral connector is provided. By integrating the connector and the hinge into a single assembly, the connector requires less space for mounting within the device. In another aspect, by integrating the connector with the hinge, a total thickness "t" of the device and/or outer diameter of the hinge may be minimized. In addition, by integrating the connector with the hinge, one or more components of the connector may be eliminated.

Figure 1:
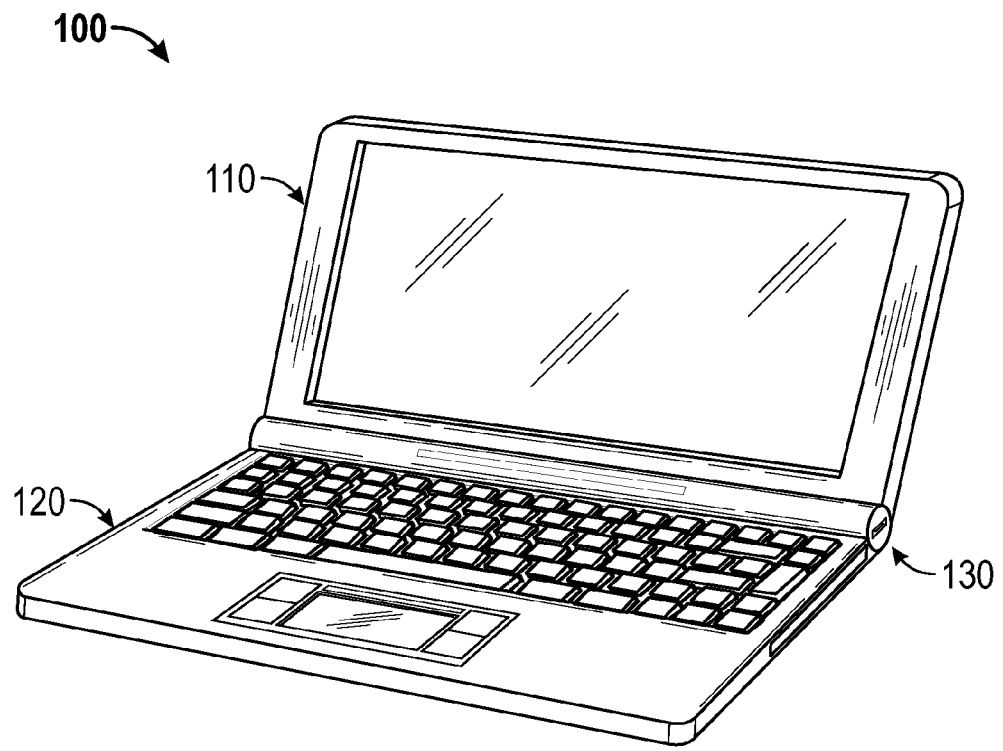
FIG. 1 illustrates an example of a device having a display portion, a base portion, and a connector integrated into a hinge.

FIG. 1 illustrates an example of a device 100 having a display portion 110, a base portion 120, and a connector integrated into a hinge 130. The device may be a portable computer, such as a laptop. The display portion 110 may be configured to include a display, such as an LCD or LED display. The base portion 120 may be configured for data entry and comprise a keyboard and/or a track pad. The device 100 may also have one or more hinges 130 disposed intermediate of the display portion 110 and the base portion 120.

Figure 2:
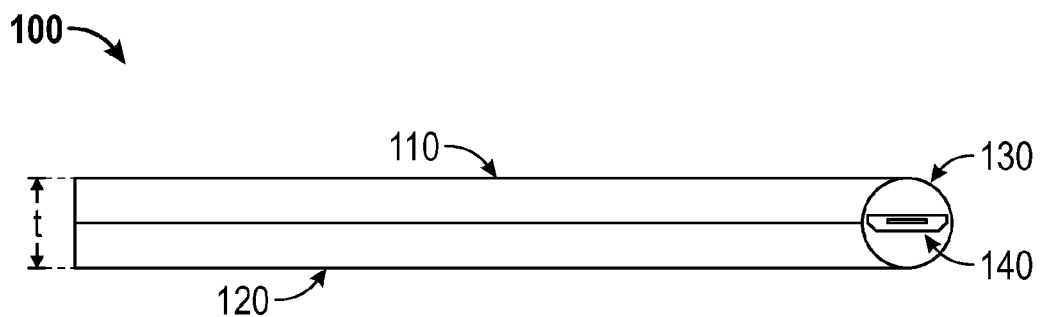
FIG. 2 illustrates a side view of an example device having a display portion, a base portion, and a connector integrated into a hinge.

FIG. 2 illustrates a side view of the device 100 having the display portion 110, the base portion 120, and a connector 140 integrated into the hinge 130. The device may have a total thickness "t" of about 8 mm. In this example, the display portion 110 of the device 100 and the base portion 120 of the device 100 may each having a thickness of about 4 mm. The hinge 130 may have an outer diameter of about 8 mm. In another example, the device may have a total thickness "t" of about 7 mm or 6 mm, with the hinge 130 having an outer diameter of about 7 mm or 6 mm, respectively.

In some aspects, the connector 140 may be disposed within the hinge 130 because the hinge 130 may have more material to accommodate the connector 140 in comparison to the display portion 110 and the base portion 120. A connector for the device 100 may require more material for mounting than what is available within the thickness of the display portion 110 or the base portion 120. For example, because the display portion 110 and the base portion 120 each have a minimal thickness of about 4 mm, a connector, such as a conventional micro USB connector, may not physically fit within the thickness of the display portion 110 or the base portion 120 of the device 100. The hinge 130, however, may have sufficient material to accommodate a connector because it may have an outer diameter larger than the thickness of the display portion 110 or base portion 120. Accordingly, the hinge 130 may be configured to include the connector 140 therein.

In some aspects, the connector 140 may be configured to be integral with the hinge 130 to minimize the amount of material necessary for mounting the connector 140. For example, in some aspects, by integrating the connector 140 into the hinge 130, components of a conventional connector may be eliminated and replaced by a feature of the hinge 130, thereby enabling the connector to be mounted in the device 100 using minimal mounting space.

Figure 7A:
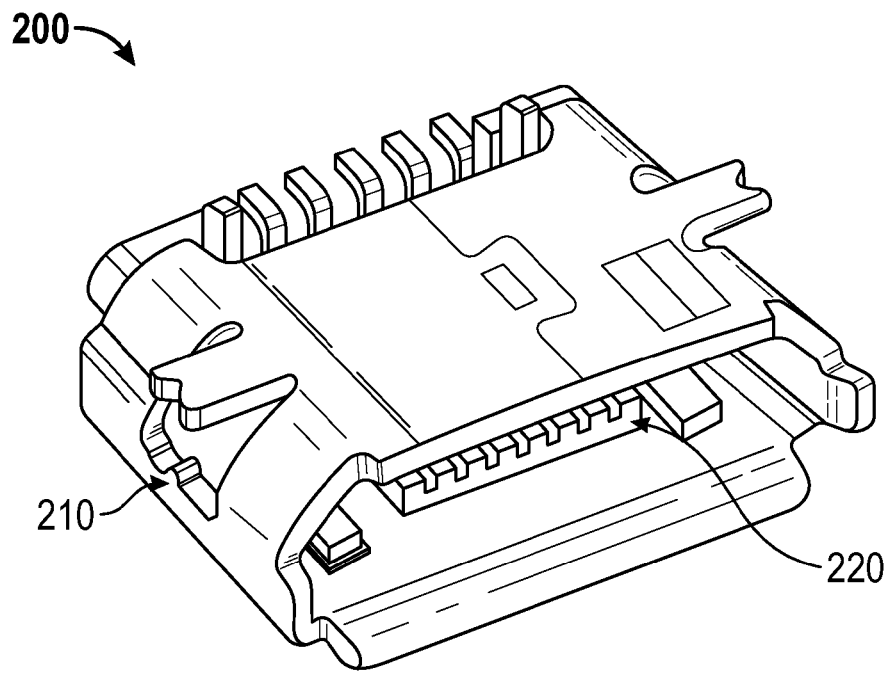
FIG. 7A illustrates a conventional micro USB connector.
Figure 7B:
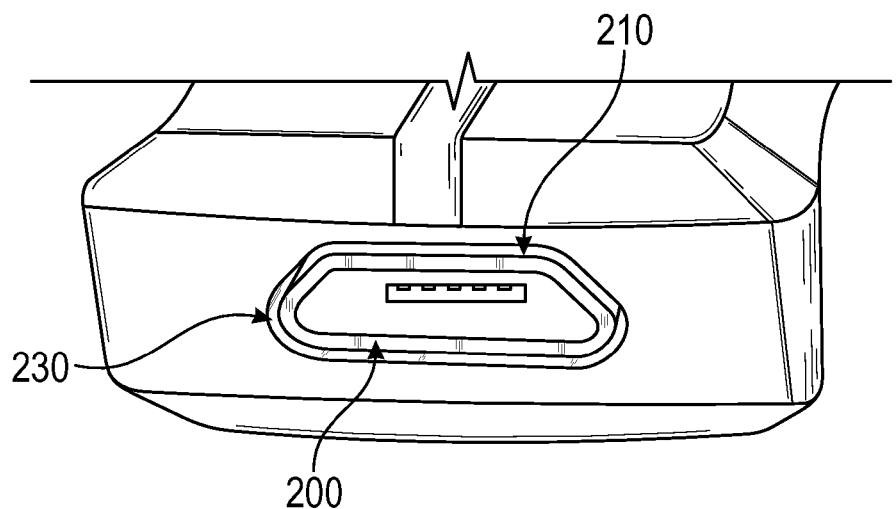
FIG. 7B illustrates a conventional micro USB connector mounted within a device.

For example, referring to FIGS. 7A and 7B, a conventional micro USB connector 200 may comprise a shell 210 for shielding and/or grounding the connector 200, a tongue 220, and contacts (not shown). The contacts may be disposed on the tongue 220. The tongue 220 may facilitating electrical communication between a corresponding contact of a mating connector by aligning the contacts of the mating connector with the contacts of the connector 200. As shown in FIG. 7B, mounting of the conventional micro USB connector 200 within a device may require a mounting location to have sufficient space to accommodate an opening 230 of a sufficiently large size to accept the shell 210.

In contrast, referring to FIG. 2, because the connector 140 may be configured to be integral with the hinge 130, the shell 210 of the conventional micro USB connector 200 may be eliminated and replaced by a feature of the hinge 130, as discussed further below. For example, the hinge 130 may be configured to shield and/or ground the connector 140, thereby providing the function of the shell 210. The hinge 130 therefore, may form a part of the connector 140. Accordingly, by eliminating a component of the conventional micro USB connector 200, a size of an opening required for mounting a micro USB connector may be reduced.

In some aspects, by integrating the connector 140 into the hinge 130, the thickness of the display portion 110 or the base portion 120 of the device 100 is not altered or increased because of the connector 140. Accordingly, the integrated connector 140 and hinge 130 may maintain the total thickness "t" of the device 100.

Figure 3:
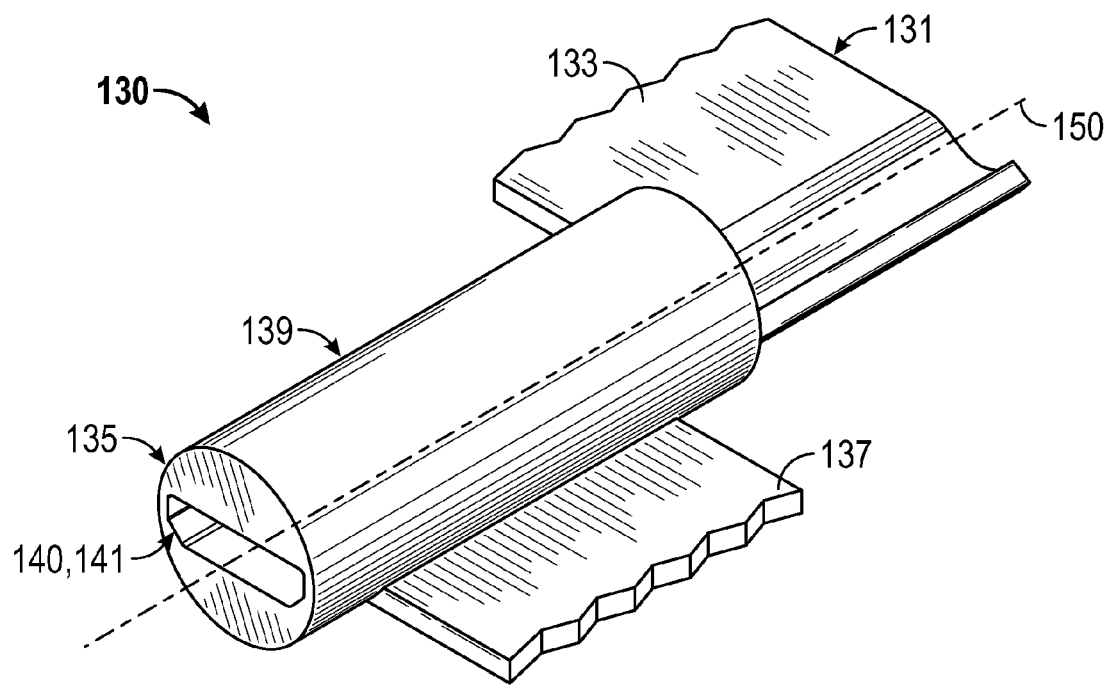
FIG. 3 is an isometric view of an example hinge.

FIG. 3 is an isometric view of the hinge 130. The hinge 130 may comprise a housing 135, friction band 131, and the connector 140. The housing 135 may include a base member 137 configured to attach to either the base portion 120 or the display portion 110. The friction band 131 may include a display member 133 configured to attach to either the display portion 110 or the base portion 120. The base member 137 and the display member 133 are configured to rotate about a pivot axis 150 that extends longitudinally along the hinge 130. The display member 133 and the base member 137 may be attached to the display portion 110 and the base portion 120 with hardware, adhesive, or by other suitable means as may be known by a person of ordinary skill.

The hinge 130 may be configured to act as a friction hinge, thereby rotationally resisting motion between the base member 137 and the display member 133. Specifically, the friction band 131 may be configured to generate friction against the housing 135. For example, the friction band 131 may be utilized in compression, with an outer surface of the friction band 131 contacting an inner surface of the housing 135, to thereby generate friction between the friction band 131 and the housing 135, as discussed further below.

Figure 5:
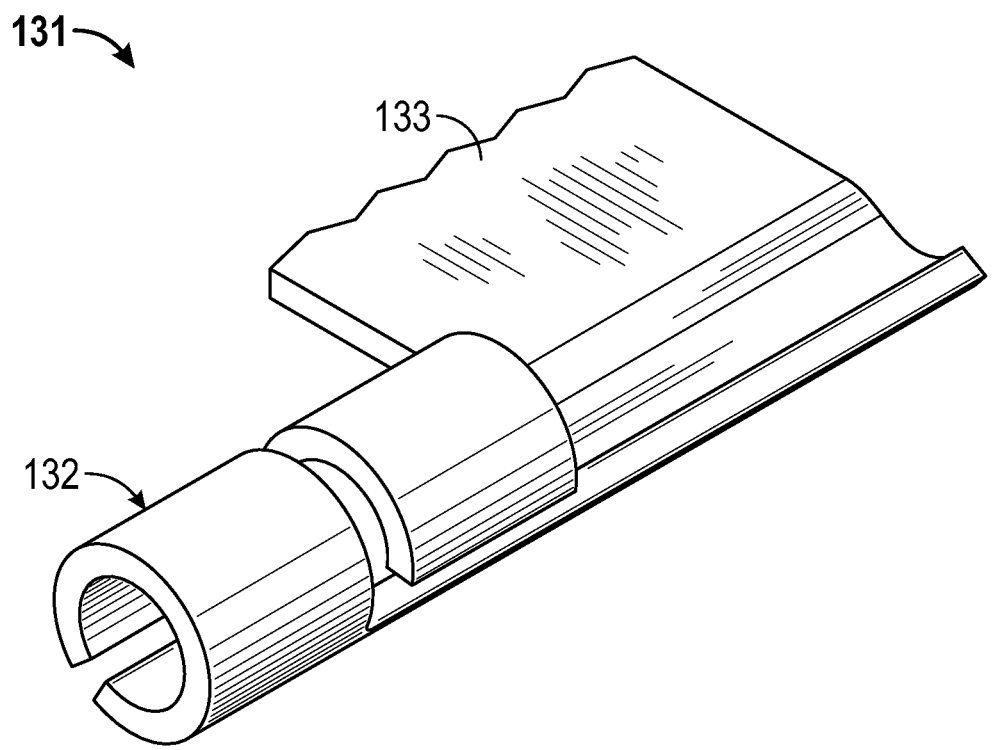
FIG. 5 is an isometric view of an example friction band.

FIG. 5 is an isometric view of the friction band 131. In some aspects, the first portion of the friction band 131 may comprise one or more compression members 132 that are configured to fit within the housing 135 and generate the friction against the inner surface of the housing 135. For example, the compression members 132 may be configured to have a natural state (e.g., uncompressed) that may be substantially planar or cylindrical. Deflection of the compression members 132 by the housing 135 into a compressed configuration, causes an outer surface of the compression members 132 to act against the inner surface of the housing 135 to thereby generate the friction.

In example aspects, the friction band 131 may include a first portion and a second portion. The first portion may be configured to fit within the housing 135 and generate the friction. The second portion may be configured to include the display member 133. The first portion and the second portion may be comprised of a similar material, such as a metal, a metal alloy, beryllium copper, or stainless steel. In another aspect, the first portion and the second portion may be comprised of a dissimilar material, such as a composite with the first portion comprising a plastic or resin and the second portion comprising a metal. The friction band 131 may have a thickness of about 1 mm.

Figure 6:
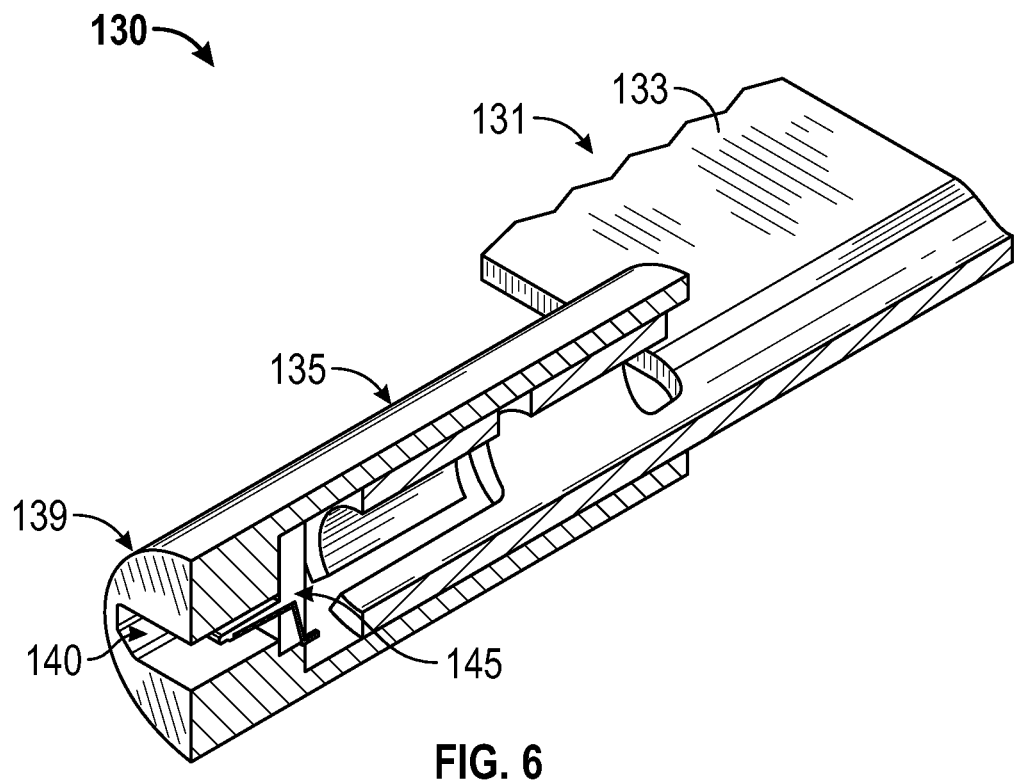
FIG. 6 is an isometric cross section view of an example hinge.

FIG. 6 is an isometric cross section view of the hinge 130. A conventional friction hinge may generate friction by utilizing a friction band in tension, with the friction band wound around a shaft to thereby generate friction between the friction band and the shaft. In contrast, the subject technology generates friction by utilizing the friction band 131 in compression, as discussed above. Because friction may be generated between the outer surface of the friction band 131 and the inner surface of the housing 135, the hinge 130 may generate friction without a shaft. In some aspects, because the hinge 130 generates friction without a shaft, a portion of the hinge 130 may include a substantially cylindrical hollowed center, as shown in FIG. 6. The hinge 130 therefore, may be configured to provide a clearance for the connector 140, a connector tongue 145, and/or cables or wires to be routed through the hinge 130.

Referring to FIG. 6, the housing 135 may be configured to generate friction with the friction band 131. As discussed above, a portion of the inner surface of the housing 135 may be in contact with the friction band 131 to generate friction. Specifically, the outer surface of the compression members 132 may contact and act against the inner surface of the housing 135 to generate the friction. In some aspects, to facilitate the generation of friction, the housing 135 may comprise a metal or metal alloy, such as stainless steel, or may comprise other friction generating materials that may be sufficiently rigid and structurally suitable as may be known by a person of ordinary skill.

In some aspects, the housing 135 may be further configured to form a part of the connector 140. The housing 135 of the hinge 130 may be configured with an internal surface for receiving the connector tongue 145. The connector tongue 145 may be attached to the internal surface of the housing 135 either mechanically or with an adhesive, to thereby enable a connection between the connector 140 and a corresponding mating connector (not shown). In another example, the connector tongue 145 may be insert molded into the housing 135 to thereby enable a connection between the connector 140 and a corresponding mating connector (not shown). Specifically, the housing 135 may facilitate connection of the connector 140 to the corresponding mating connector by aligning the connecting tongue 145 relative to the corresponding mating connector.

Figure 4:
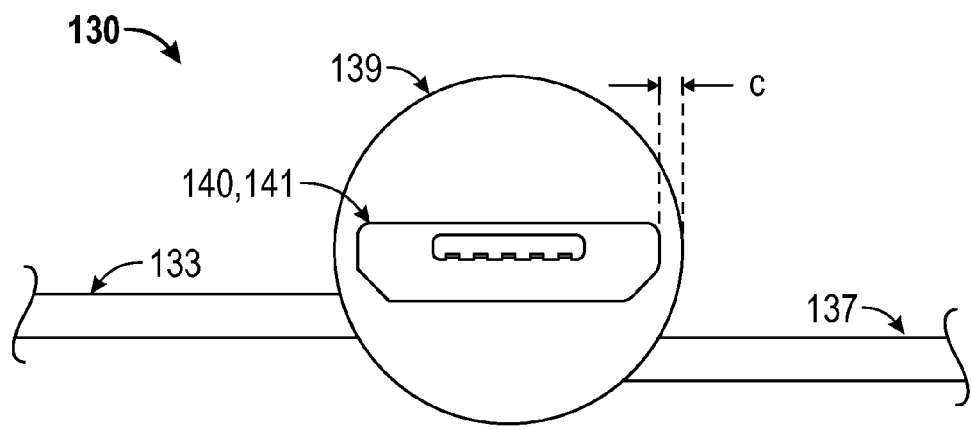
FIG. 4 is a side view of an example hinge.

The housing 135 may also be configured to directly receive the corresponding mating connector, to thereby form a part of the connector 140. Referring to FIGS. 3 and 4, the housing 135 may comprise an opening 141 that is sized to directly receive the corresponding mating connector. The connector 140 may, for example, comprise a micro USB connector (as described above), an external display connector, a power connector, or an audio connector. If the connector 140 comprises a micro USB connector, then a dimension of the opening 141 may be substantially similar to an inner dimension of the shell 210 (shown in FIGS. 7A and 7B) of the conventional micro USB connector 200. If the connector 140 comprises an external display connector, then the dimension of the opening 141 may be substantially similar to an inner dimension of a shell of a conventional external display connector. If the connector 140 comprises a power connector, then the dimension of the opening 141 may be substantially similar to an inner dimension of a shell of a conventional power connector. If the connector 140 comprises an audio connector, then the dimension of the opening 141 may be substantially similar to an inner dimension of a plastic shell of a conventional audio connector.

In another aspect, the housing 135 may eliminate and replace a component of a conventional connector, to thereby enable the connector to be mounted in the device 100 using minimal mounting space. For example, if the connector 140 comprises a micro USB connector, then the housing 135 and the opening 141 may eliminate and replace the shell 210 of the conventional micro USB connector 200 (shown in FIGS. 7A and 7B). The housing 135 and the opening 141 may perform the same function as the shell by structurally supporting the corresponding mating connector, shielding the connector 140, and/or grounding the connector 140. By eliminating a component of the conventional micro USB connector 200, a size of an opening required for mounting a micro USB connector may be reduced, thereby enabling the connector 140 to be disposed within the hinge 130 with minimal space.

FIG. 4 is a side view of the hinge 130. In one aspect, a minimal material thickness or wall thickness "c" between an outer surface or diameter 139 of the hinge 130 and the connector 140 may be about 0.50 mm or 0.40 mm. Because the housing 135 may comprise a rigid material such as a metal, the wall thickness of the housing 135 and the connector 140 may be minimized, to further maintain a minimal total thickness "t" of the device 100, without compromising the structural integrity of the hinge 130.

Figure 8:
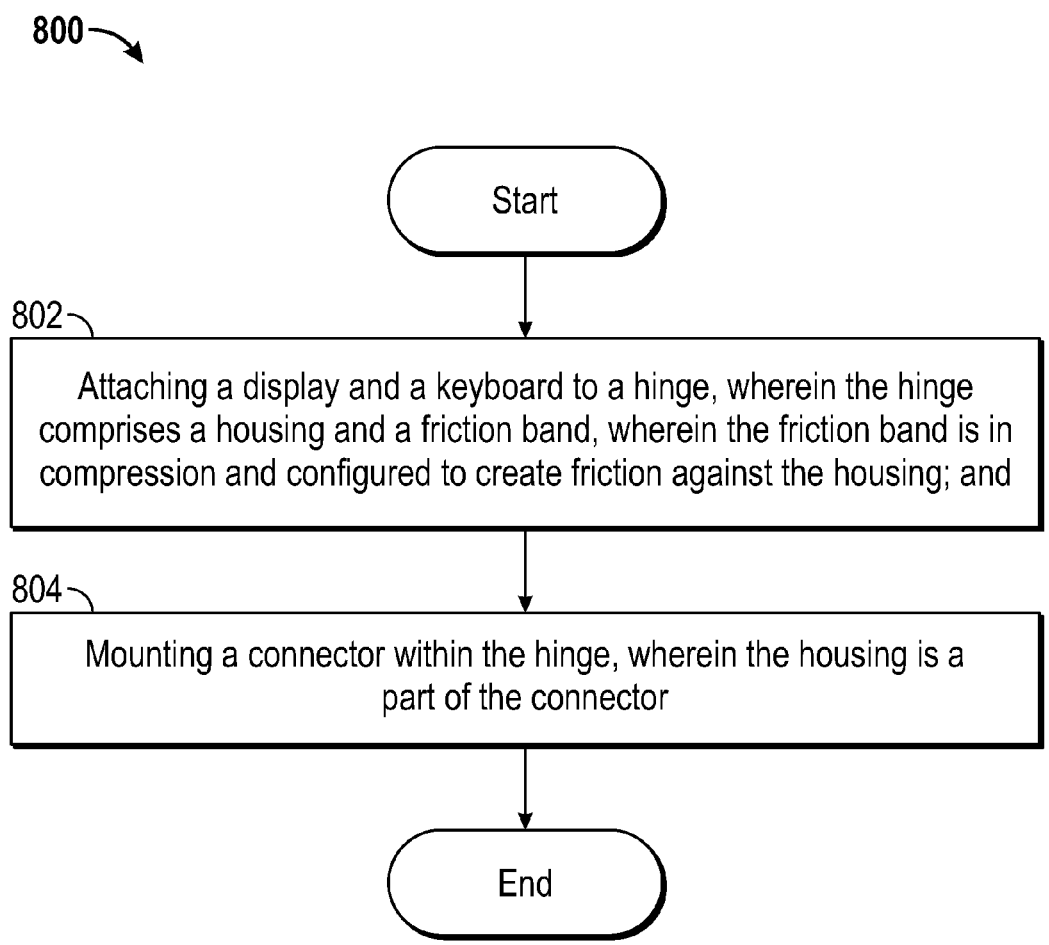
FIG. 8 illustrates an example of a process for mounting a connector within a device.

FIG. 8 illustrates an example of a process 800 for mounting a connector within a device. Process 800 comprises attaching a display and a keyboard to a hinge, wherein the hinge comprises a housing and a friction band, wherein the friction band is in compression and configured to create friction against the housing (S802); and mounting a connector within the hinge, wherein the housing is a part of the connector (804).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "upper," "bottom," "lower," "right," "left," "up," "down," "forward," "backward," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A device having a display and a keyboard, the device comprising:
    a hinge disposed intermediate of the display and the keyboard;
    wherein the hinge comprises a housing, multiple friction bands, and a connector;
    wherein the friction bands are in compression with an inner portion of the housing and configured to create friction outwardly against the inner portion of the housing; and
    wherein the housing is part of the connector.

2. The device of claim 1, wherein the hinge has an outer diameter of about 8 mm.

3. The device of claim 1, wherein the hinge has an outer diameter of about 7 mm.

4. The device of claim 1, wherein the hinge has an outer diameter of about 6 mm.

5. The device of claim 1, wherein the connector is a micro USB.

6. The device of claim 1, wherein the connector is for an external display.

7. The device of claim 1, wherein the connector is for power.

8. The device of claim 1, wherein the connector is for audio.

9. The device of claim 1, wherein the housing shields the connector.

10. The device of claim 1, wherein the housing grounds the connector.

11. The device of claim 1, wherein the housing aligns the connector to a corresponding mating connector.

12. The device of claim 1, wherein a material thickness between an outer diameter of the hinge and the connector is about 0.50 mm.

13. The device of claim 1, wherein a material thickness between an outer diameter of the hinge and the connector is about 0.40 mm.

14. The device of claim 1, wherein the housing comprises metal.

15. The device of claim 13, wherein the housing comprises stainless steel.

16. The device of claim 1, wherein at least one of the friction bands comprises metal.

17. The device of claim 15, wherein at least one of the friction bands comprises beryllium copper.

18. The device of claim 15, wherein at least one of the friction bands comprises stainless steel.

19. The device of claim 1, wherein at least one of the friction bands comprises a composite.

20. The device of claim 1, wherein a thickness of at least one of the friction bands is about 1 mm.

21. The device of claim 1, wherein at least a portion of the hinge includes a substantially cylindrical hollowed center.

22. A method for mounting a connector within a device, the method comprising:
    attaching a display and a keyboard to a hinge, wherein the hinge comprises a housing and multiple friction bands, wherein the friction bands are in compression with an inner portion of the housing and configured to create friction outwardly against the inner portion of the housing; and
    mounting a connector within the hinge, wherein the housing is a part of the connector.

23. The method of claim 21, wherein the hinge has an outer diameter of about 8 mm.

24. The method of claim 21, wherein the hinge has an outer diameter of about 7 mm.

25. The method of claim 21, wherein the hinge has an outer diameter of about 6 mm.

26. The method of claim 21, wherein the connector is a micro USB.

* * * * *